US011456940B2

(12) United States Patent
Khaled et al.

(10) Patent No.: US 11,456,940 B2
(45) Date of Patent: Sep. 27, 2022

(54) ADAPTIVE POLLING BASED ON LINK QUALITY

(71) Applicant: Itron Global SARL, Liberty Lake, WA (US)

(72) Inventors: Yacine Khaled, Meudon (FR); Jerome Bartier, Edinburgh (GB); Khalid Maallem, Issy les Moulineaux (FR)

(73) Assignee: Itron Global SARL, Liberty Lake, WA (US)

( * ) Notice: Subject to any disclaimer, the term of this patent is extended or adjusted under 35 U.S.C. 154(b) by 38 days.

(21) Appl. No.: 16/909,402

(22) Filed: Jun. 23, 2020

(65) Prior Publication Data

US 2021/0399970 A1 Dec. 23, 2021

(51) Int. Cl.
*H04L 12/26* (2006.01)
*H04L 43/10* (2022.01)
*H04W 24/08* (2009.01)

(52) U.S. Cl.
CPC ............. *H04L 43/10* (2013.01); *H04W 24/08* (2013.01)

(58) Field of Classification Search
CPC ..... H04L 43/10; H04L 1/0015; H04L 1/1685; H04W 24/08
See application file for complete search history.

(56) References Cited

U.S. PATENT DOCUMENTS

| 2004/0156351 | A1* | 8/2004 | Kim ...................... H04W 74/06 370/349 |
| 2009/0003356 | A1 | 1/2009 | Vaswani et al. |
| 2012/0155299 | A1 | 6/2012 | Reams |
| 2013/0223419 | A1* | 8/2013 | Ghosh ............... H04W 52/0235 370/338 |
| 2014/0112226 | A1* | 4/2014 | Jafarian ............ H04W 52/0229 370/311 |
| 2015/0319635 | A1* | 11/2015 | Bergquist .............. H04W 74/06 370/241.1 |
| 2019/0007186 | A1* | 1/2019 | Nguyen .................. H04L 1/203 |
| 2020/0275481 | A1* | 8/2020 | Turtinen ................. H04L 1/188 |

FOREIGN PATENT DOCUMENTS

EP 2592871 A1 5/2013

OTHER PUBLICATIONS

Extended European Search Report dated Nov. 5, 2021 for European Patent Application No. 21181238.3, 10 pages.

* cited by examiner

*Primary Examiner* — Walli Z Butt
(74) *Attorney, Agent, or Firm* — Lee & Hayes, P.C.

(57) ABSTRACT

Techniques are directed to determining, based at least in part on link quality metric data associated with communication over a link between the first node and a second node, to send an information message to the second node preceded by sending a corresponding polling message to the second node or to send the information message to the second node not preceded by sending the corresponding polling message to the second node. Based at least in part on the determining, a node may send the information message to the second node preceded by sending the corresponding polling message to the second node or sending the information message to the second node not preceded by sending the corresponding polling message to the second node. Overhead associated with polling messages may be reduced.

19 Claims, 6 Drawing Sheets

ADAPTIVE POLLING BASED ON LINK QUALITY

BACKGROUND

Communication networks, such as wireless mesh networks, star networks, and so on, are used to connect a variety of different devices. In some configurations, an information exchange process includes a transmitting device in a network sending a polling message to a potential receiving device to determine if the potential receiving device is available to receive an information message. For example, if the transmitting device receives an acknowledgement message in response to the polling message, the transmitting device may then send the information message. While the use of polling messages may increase the probability that a corresponding information message will be successfully communicated, the use of polling messages also adds overhead to the information exchange process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
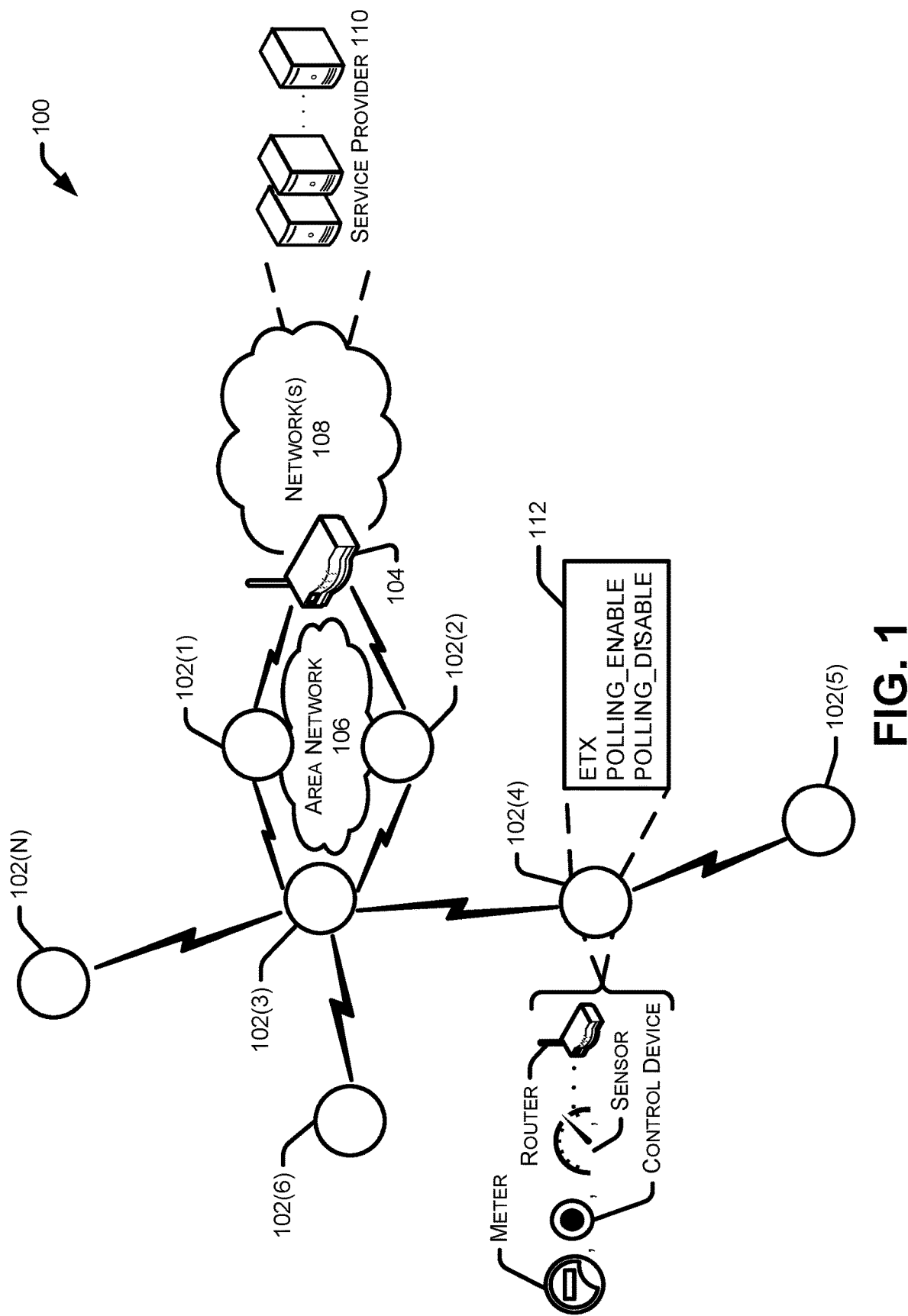
FIG. 1 is a schematic diagram of an example network architecture.

In one illustration, a first node in a network communicates with a direct neighbor node at the data link layer by first sending a polling message to the direct neighbor node. If the first node receives an acknowledgement message from the direct neighbor node corresponding to the polling message, the direct neighbor node is available for communication with the first node. The first node also sends an information message to the direct neighbor node. If the first node receives an acknowledgement message to the information message from the direct neighbor node, the direct neighbor node successfully received the information message. This exchange may be called a PADA exchange (POLL-ACK-DATA-ACK).

A node can compute link quality metric data, such as Expected Transmission count (ETX) metric, to each of its direct neighbor nodes. For example, a node may use an exponentially weighted moving average formula. A node can make this computation whenever it sends an information message, based at least in part on whether the node receives an information acknowledgement message after sending an information message.

As discussed above, the use of polling messages may increase the probability that a corresponding information message will be successfully communicated, thus increasing the reliability of information exchange. However, the use of polling messages adds overhead to the information exchange process. In some situations, an information message may be sent not preceded by sending the corresponding polling message to the second node.

This disclosure describes techniques directed to determining, based at least in part on link quality metric data associated with communication over a link between the first node and a second node, to send an information message to the second node preceded by sending a corresponding polling message to the second node or to send the information message to the second node not preceded by sending the corresponding polling message to the second node. For example, the link quality metric data may correspond to a link quality that is above a polling disable threshold, and the determining may include determining to send the information message to the second node not preceded by sending the corresponding polling message to the second node. As another example, the link quality metric data may correspond to a link quality that is below a polling enable threshold, and the determining may include determining to send the information message to the second node preceded by sending the corresponding polling message to the second node. Based at least in part on the determining, a node may send the information message to the second node preceded by sending the corresponding polling message to the second node or sending the information message to the second node not preceded by sending the corresponding polling message to the second node.

In one illustration, the link quality metric data is an ETX metric. The ETX metric is inversely proportional to link quality. If, for example, the ETX exceeds a POLLING_ENABLE parameter value, then the node determines to send the information message preceded by sending the corresponding polling message. If, for example, the ETX is lower than a POLLING_DISABLE parameter value, then the node determines to send the information message not preceded by sending the corresponding polling message. The POLLING_ DISABLE parameter value may be lower than the POLLING_ENABLE parameter value. Otherwise, for example, if the link quality metric data were to be close to a single value utilized for both the POLLING_ENABLE parameter value and the POLLING_DISABLE parameter value, slight changes to the link quality metric data may result in frequent vacillation between sending the information message preceded by sending the corresponding polling message and sending the information message not preceded by sending the corresponding polling message.

In some examples, in addition, based at least in part on a node unsuccessfully communicating the information message not preceded by a corresponding polling message, the techniques may include the node resending the information message, preceded by sending the corresponding polling message. For example, a node may determine to resend an information message, preceded by a corresponding polling message, without specific regard for the link quality metric data.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein are applicable to any communications network, control network, and/or another type of network or system. In one example, the techniques may be implemented in the context of the Internet of Things (IoT).

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which network communication devices relay data through the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In the FIG. 1 illustration, a data structure 112 holds an ETX value that is updated by the network communication device 102(4). In some examples, other link quality values may be used instead of or in addition to the ETX value. The data structure 112 also holds a POLLING_ENABLE parameter value and a POLLING_DISABLE parameter value, that may be used by the communication device 102(4) to determine to send an information message preceded by sending a corresponding polling message or to send the information message not preceded by sending the corresponding polling message.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples, communication metric data includes an ETX metric and/or an Expected Transmission Time (ETT) metric, as discussed in further detail below.

In many instances, communication metric data may include data that is specific to a particular data rate and/or to a particular link (e.g., direct communication path between devices). To illustrate, communication metric data may indicate a number of successful transmissions and a number of transmission attempts via a particular link (between a first node and a second node) with a particular data rate.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals 1/P, where P=Pf×Pr. Here, Pf corresponds to a probability that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions (e.g., probes)}}{\text{Number of transmissions (e.g., probes)}}$$
$$\text{sent by a sender}$$

$$Pr = \frac{\text{Number of transmissions (e.g., probes)}}{\text{Number of transmissions (e.g., probes)}}$$
$$\text{sent by a neighbor (e.g., receipient)}$$

In some instances, such as where Pf and Pr cannot be computed separately (e.g., when the sender does not know the number of transmissions that a receiver sent to it), then the ETX metric may be estimated as in the first example above. That is, if Pf and Pr cannot be computed separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied by the ETX metric.

Communication metric data may be used in a variety of manners. In some instances, communication metric data is used by a node to determine to send an information message preceded by sending a corresponding polling message to a second node or to send the information message not preceded by sending the corresponding polling message to the second node.

Example Network Communication Device

Figure 2:
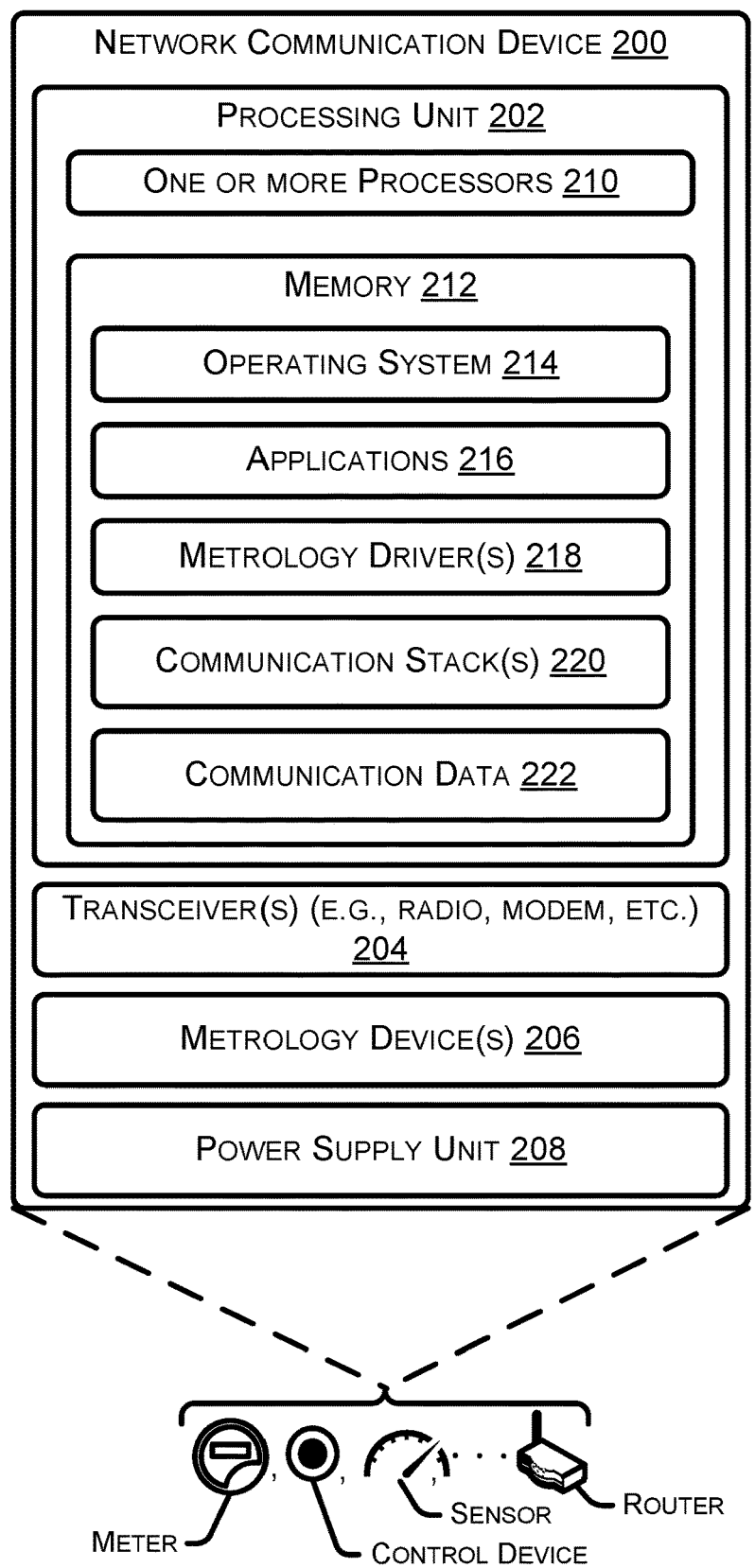
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, computer system(s) in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 may comprise physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store communication data 222. Communication data 222 may include communication metric data that is updated from time to time to maintain data for multiple data rates and/or multiple communication links. The communication data 222 may also include communication parameters, such as threshold parameters the communication device 200 may utilize to determine to send an information message preceded by sending a corresponding polling message or to send the information message not preceded by sending the corresponding polling message.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

Figure 3:
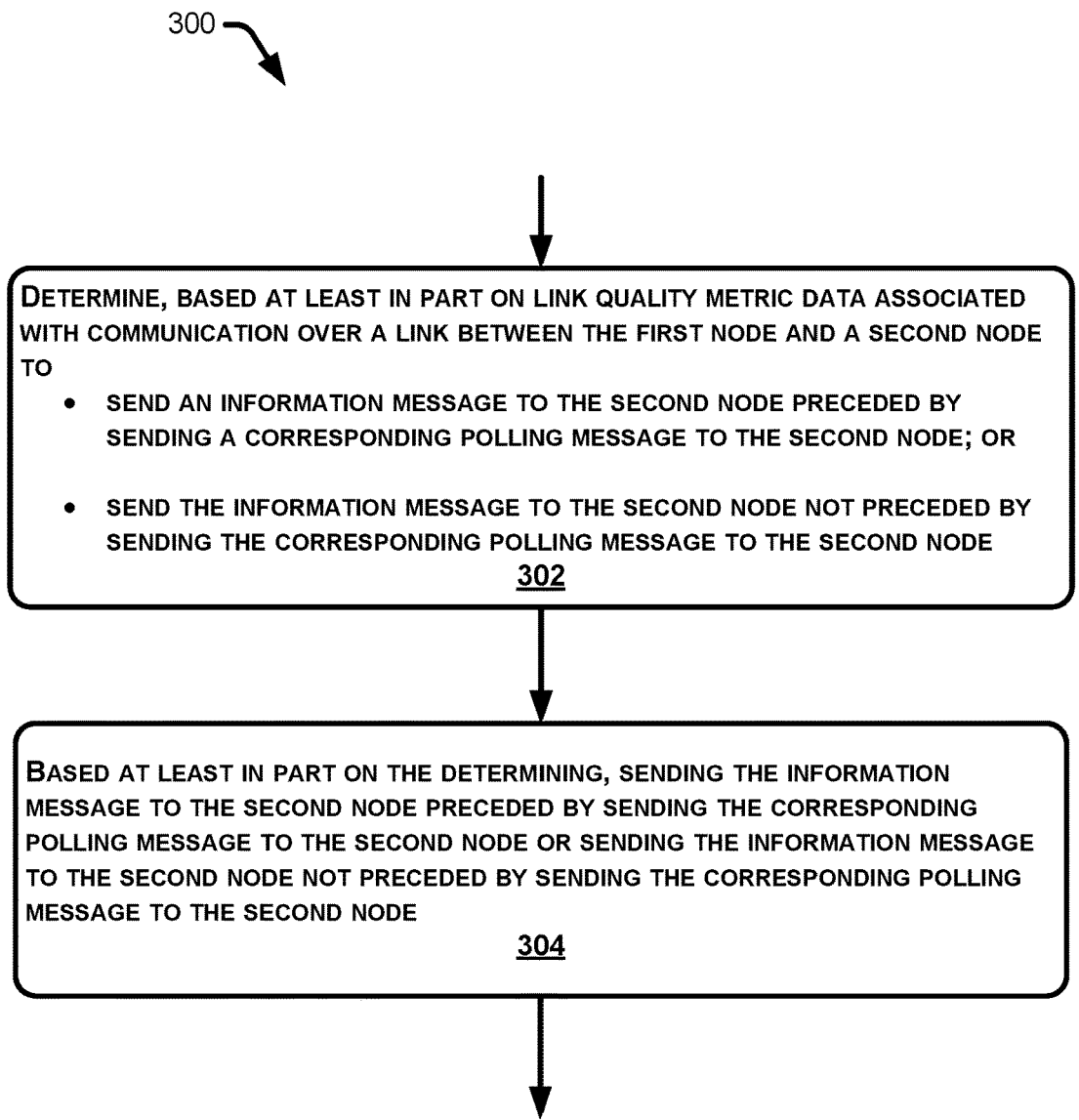
FIG. 3 illustrates an example process for a first node to communicate with a second node, with the first node selectively transmitting polling messages based at least in part on link quality metric data associated with communication over a link between the first node and the second node.
Figure 4:
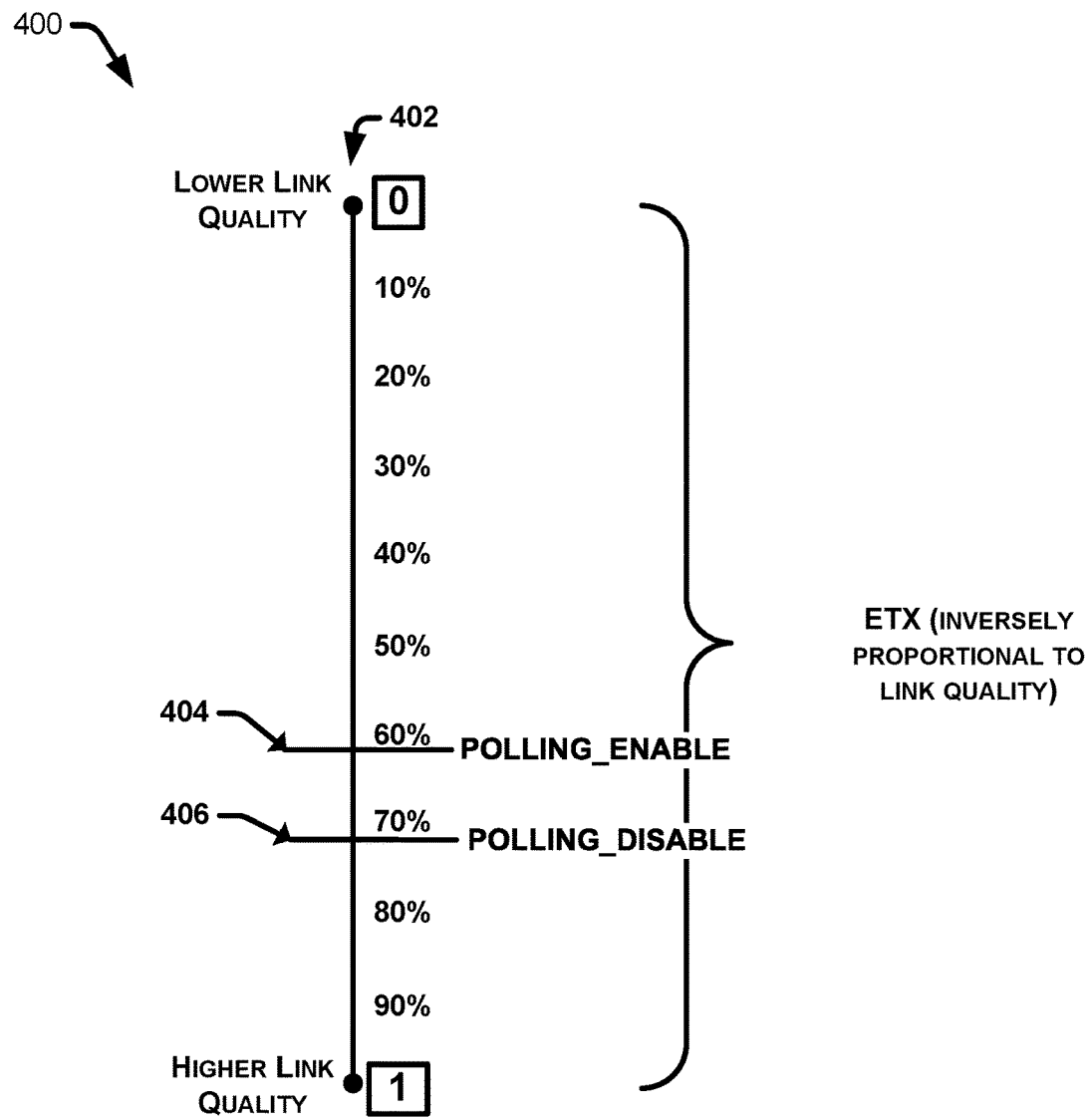
FIG. 4 illustrates example concepts upon which the determining of FIG. 3 may be based.
Figure 5:
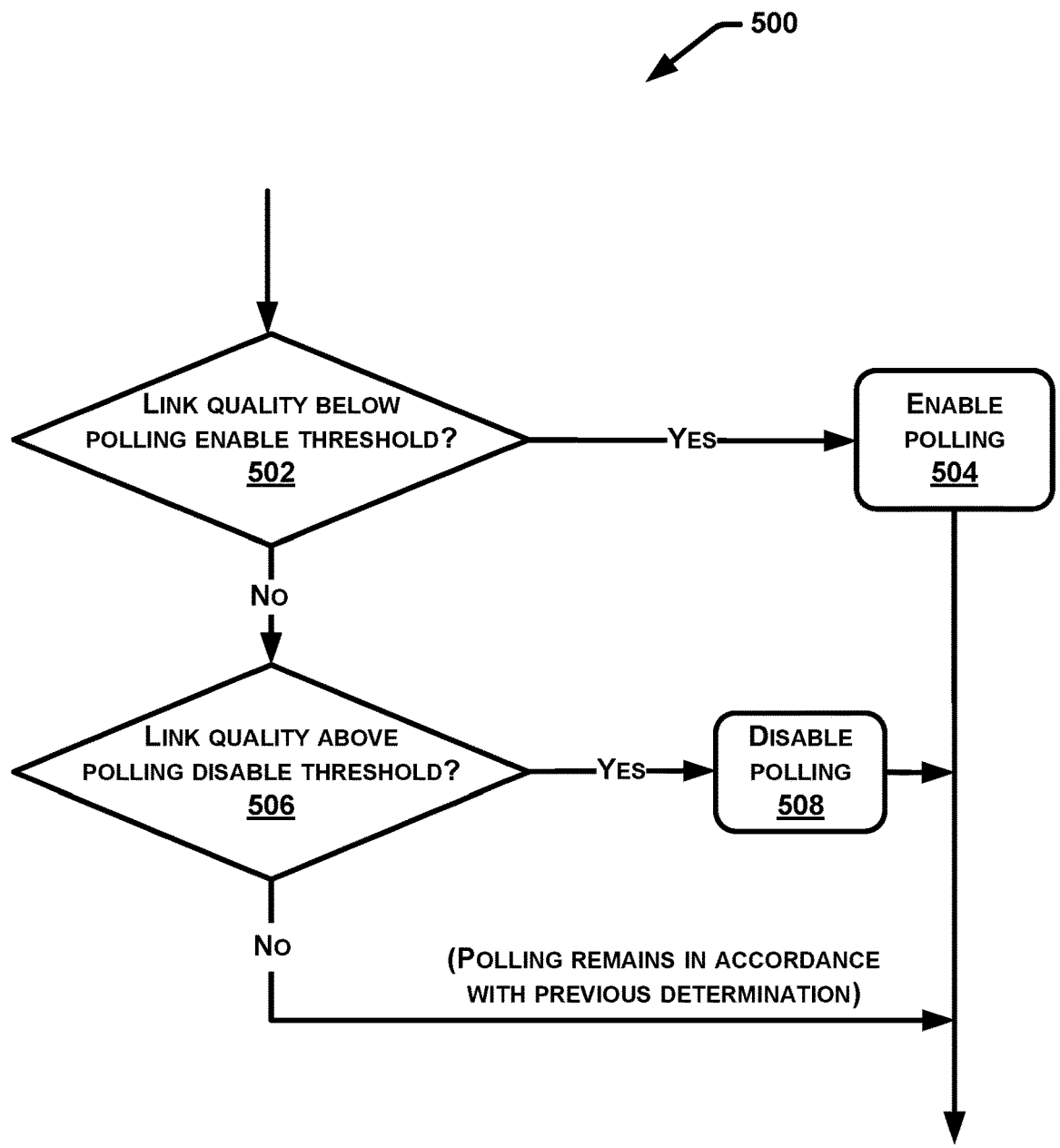
FIG. 5 illustrates an example process for the determining operation of FIG. 3.

FIGS. 3, 4 and 5 illustrate example processes 300, 400 and 500 for employing the techniques discussed herein. For ease of illustration, the processes 300, 400 and 500 may be described as being performed by a device described herein, such as the network communication device 200 and/or the service provider 110. However, the processes 300, 400 and 500 may be performed by other devices. Moreover, the devices may be used to perform other processes.

The processes 300, 400 and 500 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 3 illustrates an example process 300 for a first node to communicate with a second node. The first node selectively transmits polling messages based at least in part on link quality metric data associated with communication over a link between the first node and the second node. For example, when the link quality metric data indicates the link quality is "good," then the first node may send an information message to the second node not preceded by a corresponding polling message. When the link quality metric data indicates the link quality is "not good," then the first node may send an information message to the second node preceded by a corresponding polling message.

At 302, the first node determines, based at least in part on link quality metric data associated with communication over a link between the first node and a second node, to send an information message to the second node preceded by sending a corresponding polling message to the second node or to send the information message to the second node not preceded by sending the corresponding polling message to the second node. The link quality metric data may be for example, an ETX for the link being maintained by the first node on the basis of ongoing communication between the first node and the second node.

At 304, based at least in part on the determining at 302, the first node sends the information message to the second node preceded by sending the corresponding polling message to the second node or sends the information message to the second node not preceded by sending the corresponding polling message to the second node.

FIG. 4 illustrates how the determining (FIG. 3, 302) may be carried out. In FIG. 4, the line 402 represents link quality of a link between a first node and a second node as a probability of a communication message being successfully sent from the first node to the second node. The link quality corresponds to link quality metric data associated with communication over a link between the first node and a second node. For example, in FIG. 4, the link quality metric data may be an ETX value, which is inversely proportional to link quality. That is, as ETX increases, link quality decreases. In general, for higher link quality, polling may be disabled. For lower link quality, polling may be enabled.

Referring still to FIG. 4, a POLLING_ENABLE threshold value 404 is configured to be at a link quality generally corresponding to 60% probability, and a POLLING_DISABLE threshold value 406 is configured to be at a link quality generally corresponding to 70% link quality. This is an example, and the POLLING_ENABLE threshold value 404 and the POLLING_DISABLE threshold value 406 may be configured to be at different probabilities. The process 300 may utilize the link quality metric data, relative to the POLLING_ENABLE threshold value and POLLING_DISABLE threshold value, to determine to send an information message to the second node preceded by sending a corresponding polling message to the second node or to send the information message to the second node not preceded by sending the corresponding polling message to the second node.

For example, if a link quality metric data value such as ETX corresponds to a link quality and/or probability that is above the POLLING_ENABLE threshold value 404, then process 300 may determine to send an information message to the second node preceded by sending a corresponding polling message to the second node. Further, for example, if the link quality metric data value such as ETX corresponds to a link quality and/or probability that is below the POLLING_DISABLE threshold value 406, then process 300 may determine to send an information message to the second node not preceded by sending a corresponding polling message to the second node.

If the link quality metric data value such as ETX corresponds to a link quality and/or probability that is between the POLLING_ENABLE threshold value 404 and the POLLING_DISABLE threshold value 406, then the determination may be to utilize the previous determination. This may introduce hysteresis into the determining operation, to minimize excessive switching between the sending information messages to the second node preceded by sending a corresponding polling message to the second node and sending information messages to the second node not preceded by sending a corresponding polling message to the second node.

FIG. 5 illustrates an example process 500 for a node to apply the concepts illustrated in FIG. 4. At 502, the node determines if the link quality is below a polling enable threshold. For example, the link quality may be indicated by an ETX and, as discussed above, ETX is inversely proportional to link quality. If the link quality is indicated by an ETX, then the determination at 502 may be to determine if the ETX is above a polling enable threshold.

At 504, if the node determines the link quality to be below the polling enable threshold, the node enables polling. That is, the node determines to send an information message to the second node preceded by sending a corresponding polling message to the second node.

If, at 502, the node determines the link quality to not be below the polling enable threshold, the node determines at 506 if the link quality is above a polling disable threshold. For example, if the link quality is indicated by an ETX (which is inversely proportional to link quality), then the determination at 506 may be to determine if the ETX is below a polling disable threshold. At 508, if the node determines the link quality to be above the polling disable threshold, the node disables polling. That is, the node determines to send an information message to the second node not preceded by sending a corresponding polling message to the second node.

If, at 502 the node determines the link quality is not below a polling enable threshold and, at 506, the node determines the link quality is not above a polling disable threshold, then the polling may remain in accordance with a previous determination. For example, if a previous determination at 302 is to send an information message to the second node preceded by sending a corresponding polling message to the second node, then the current determination is also to send an information message to the second node preceded by sending a corresponding polling message to the second node. Further, for example, if the previous determination at 302 is to send an information message to the second node not preceded by sending a corresponding polling message to the second node, then the current determination is also to send an information message to the second node not preceded by sending a corresponding polling message to the second node.

While the above discussion is for a link quality data metric such as ETX that is inversely proportional to link quality, a process similar to the FIG. 5 process 500 may be carried out for a situation in which the link quality data metric is proportional to link quality, such as packet success rate. In this situation, the comparisons in the process 500 may be inverted, such that a comparison of "less than" may become a comparison of "greater than" and vice versa.

Figure 6:
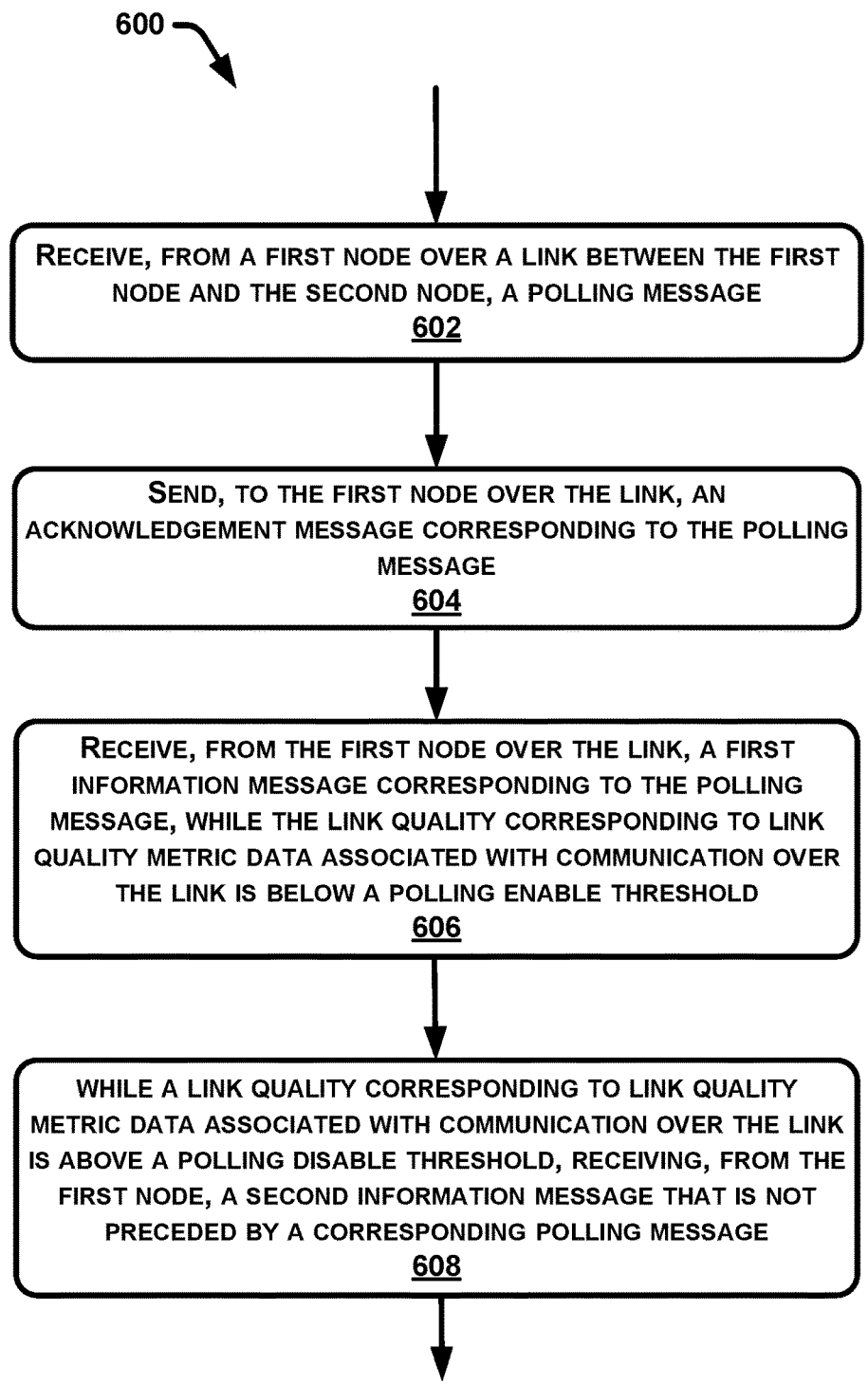
FIG. 6 illustrates an example process for a second node to communicate with a first node, where the first node selectively transmits polling messages based at least in part on link quality metric data associated with communication over a link between the first node and the second node.

FIG. 6 illustrates an example process 600 for a second node to communicate with a first node. The first node selectively transmits polling messages based at least in part on link quality metric data associated with communication over a link between the first node and the second node, such as in accordance with the process 300 (FIG. 3). For example, when the link quality metric data indicates the link quality is "good," then the first node may send an information message to the second node not preceded by a corresponding polling message. When the link quality metric data indicates the link quality is "not good," then the first node may send an information message to the second node preceded by a corresponding polling message.

Referring to FIG. 6, at 602, the second node receives, from the first node over a link between the first node and the second node, a polling message. Thus, for example, the first node may have determined (for example, based on link quality metric data) to send an information message to the second node preceded by a polling message. At 604, the second node sends, to the first node over the link, an acknowledgement message corresponding to the polling message.

At 606, the second node receives, from the first node over the link, a first information message corresponding to the polling message, while the link quality corresponding to link quality metric data associated with communication over the link is below a polling enable threshold. At 608, while a link quality corresponding to link quality metric data associated with communication over the link is above a polling disable threshold, the second node receives, from the first node, a second information message that is not preceded by a corresponding polling message.

This disclosure thus describes techniques directed to determining, based at least in part on link quality metric data associated with communication over a link between the first node and a second node, to send an information message to the second node preceded by sending a corresponding polling message to the second node or to send the information message to the second node not preceded by sending the corresponding polling message to the second node. Based at least in part on the determining, a node may send the information message to the second node preceded by sending the corresponding polling message to the second node or sending the information message to the second node not preceded by sending the corresponding polling message to the second node. Under some conditions, overhead associated with polling messages may be reduced.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a first node in a network, comprising:
   determining, based at least in part on link quality metric data associated with communication over a link between the first node and a second node, to send an information message to the second node preceded by sending a corresponding polling message to the second node or to send the information message to the second node not preceded by sending the corresponding polling message to the second node;
   based at least in part on the determining, sending the information message to the second node preceded by sending the corresponding polling message to the second node or sending the information message to the second node not preceded by sending the corresponding polling message to the second node; and
   based at least in part on unsuccessfully communicating the information message to the second node not preceded by sending the corresponding polling message to the second node, resending the information message to the second node preceded by sending the corresponding polling message to the second node.

2. The method of claim 1, wherein:
   the link quality metric data corresponds to a link quality that is above a polling disable threshold.

3. The method of claim 1, wherein the link quality metric data includes at least one of Expected Transmission (ETX) metric data, Expected Transmission Time (ETT) metric data or packet success rate metric data.

4. The method of claim 1, wherein:
   the link quality metric data comprises Expected Transmission (ETX) metric data,
   the ETX metric data is below a polling disable threshold, and
   determining to send the information message to the second node not preceded by sending the corresponding polling message to the second node.

5. The method of claim 1, wherein:
   the link quality metric data comprises Expected Transmission (ETX) metric data,
   the ETX metric data is above a polling enable threshold, and
   determining to send the information message to the second node preceded by sending the corresponding polling message to the second node.

6. The method of claim 1, wherein:
   the link quality metric data comprises Expected Transmission (ETX) metric data,
   the ETX metric data is between a polling disable threshold and a polling enable threshold, and the determining includes determining, in accordance with a previous determining operation, to send the information message to the second node preceded by sending the corresponding polling message to the second node or to send the information message to the second node not preceded by sending the corresponding polling message to the second node.

7. The method of claim 1, wherein the link quality metric data corresponds to a link quality that is below a polling disable threshold, and
determining to send the information message to the second node preceded by sending the corresponding polling message to the second node.

8. The method of claim 1, wherein:
the link quality metric data corresponds to a link quality that is between a polling disable threshold and a polling enable threshold, and
the determining includes determining, in accordance with a previous determining operation, to send the information message to the second node preceded by sending the corresponding polling message to the second node or to send the information message to the second node not preceded by sending the corresponding polling message to the second node.

9. A method of operating a first node in a network, comprising:
receiving, from a second node over a link between the first node and the second node, a polling message;
sending, to the second node over the link, an acknowledgement message corresponding to the polling message;
receiving, from the second node over the link, a first information message corresponding to the polling message;
while a link quality corresponding to link quality metric data associated with communication over the link is above a polling disable threshold, receiving, from the second node, a second information message that is not preceded by a corresponding polling message; and
based at least in part on unsuccessfully receiving the second information message that is not preceded by a corresponding polling message, re-receiving, from the second node, the second information message that is preceded by the corresponding polling message.

10. The method of claim 9, wherein:
receiving the first information message is while the link quality corresponding to link quality metric data associated with communication over the link is below a polling enable threshold.

11. A node for operation in a network, comprising:
one or more processors; and
memory coupled to the one or more processors, the memory storing instructions executable by the one or more processors to perform operations comprising:
determining, based at least in part on link quality metric data associated with communication over a link between the node and another node, to send an information message to the other node preceded by sending a corresponding polling message to the other node or to send the information message to the other node not preceded by sending the corresponding polling message to the other node;
based at least in part on the determining, sending the information message to the other node preceded by sending the corresponding polling message to the other node or sending the information message to the other node not preceded by sending the corresponding polling message to the other node; and
based at least in part on unsuccessfully communicating the information message to the other node not preceded by sending the corresponding polling message to the other node, resending the information message to the other node, preceded by sending the corresponding polling message to the other node.

12. The node of claim 11, wherein:
the link quality metric data corresponds to a link quality that is above a polling disable threshold.

13. The node of claim 11, wherein the link quality metric data includes at least one of Expected Transmission (ETX) metric data, Expected Transmission Time (ETT) metric data or packet success rate metric data.

14. The node of claim 11, wherein:
the link quality metric data comprises Expected Transmission (ETX) metric data,
the ETX metric data is below a polling disable threshold, and
determining to send the information message to the other node not preceded by sending the corresponding polling message to the other node.

15. The node of claim 11, wherein:
the link quality metric data comprises Expected Transmission (ETX) metric data,
the ETX metric data is above a polling enable threshold, and
determining to send the information message to the other node preceded by sending the corresponding polling message to the other node.

16. The node of claim 11, wherein:
the link quality metric data comprises Expected Transmission (ETX) metric data,
the ETX metric data is between a polling disable threshold and a polling enable threshold, and
the determining includes determining, in accordance with a previous determining operation, to send the information message to the other node preceded by sending the corresponding polling message to the other node or to send the information message to the other node not preceded by sending the corresponding polling message to the other node.

17. The node of claim 11, wherein the link quality metric data corresponds to a link quality that is below a polling disable threshold, and
determining to send the information message to the other node preceded by sending the corresponding polling message to the other node.

18. The node of claim 11, wherein:
the link quality metric data corresponds to a link quality that is between a polling disable threshold and a polling enable threshold, and
the determining includes determining, in accordance with a previous determining operation, to send the information message to the other node preceded by sending the corresponding polling message to the other node or to send the information message to the other node not preceded by sending the corresponding polling message to the other node.

19. The method of claim 9, wherein the link quality metric data includes at least one of Expected Transmission (ETX) metric data, Expected Transmission Time (ETT) metric data or packet success rate metric data.

* * * * *